(12) United States Patent
Aughton

(10) Patent No.: US 9,376,779 B2
(45) Date of Patent: Jun. 28, 2016

(54) CONTROL GATES AND VALVES

(71) Applicant: Rubicon Research Pty Ltd, Hawthorn, Victoria (AU)

(72) Inventor: David John Aughton, Hawthorn (AU)

(73) Assignee: Rubicon Research Pty Ltd, Hawthorn East, Victoria (AU)

( * ) Notice: Subject to any disclaimer, the term of this patent is extended or adjusted under 35 U.S.C. 154(b) by 0 days.

(21) Appl. No.: 14/414,067

(22) PCT Filed: Jul. 12, 2013

(86) PCT No.: PCT/AU2013/000777
§ 371 (c)(1),
(2) Date: Jan. 9, 2015

(87) PCT Pub. No.: WO2014/008553
PCT Pub. Date: Jan. 16, 2014

(65) Prior Publication Data
US 2015/0191884 A1    Jul. 9, 2015

(30) Foreign Application Priority Data
Jul. 13, 2012    (AU) .................................. 2012903003

(51) Int. Cl.
*E02B 5/08* (2006.01)
*E02B 7/40* (2006.01)
(Continued)

(52) U.S. Cl.
CPC ... *E02B 5/08* (2013.01); *E02B 7/40* (2013.01); *E02B 8/04* (2013.01); *E02B 13/02* (2013.01);
(Continued)

(58) Field of Classification Search
USPC ............. 405/87, 90, 91, 99, 100, 102
See application file for complete search history.

(56) References Cited

U.S. PATENT DOCUMENTS

| 187,411 A | 2/1877 | Painter |
| 3,208,225 A | 9/1965 | Humpherys |

(Continued)

FOREIGN PATENT DOCUMENTS

| JP | S5523285 | 2/1980 |
| JP | 55108512 A * | 8/1980 |

(Continued)

OTHER PUBLICATIONS

Tideflex Technologies,"Tideflex Series 35 Valve," retrieved from http://www.tideflex.com/tf/index.php/series-35 on Jan. 8, 2015, available at least since Aug. 11, 2010.

(Continued)

*Primary Examiner* — Benjamin Fiorello
*Assistant Examiner* — Kyle Armstrong
(74) *Attorney, Agent, or Firm* — Sheppard, Mullin, Richter & Hampton LLP

(57) ABSTRACT

The invention discloses an overshot control gate for use with trapezoidal irrigation channels. A gate has a rigid rectangular section adapted to, in use, be pivotally mounted to a base of a trapezoidal irrigation channel. A pair of triangular sections are pivotally mounted on opposite sides of the rigid rectangular section. Each of the triangular sections are divided into first and second triangular sections with a common apex at the base of the trapezoidal irrigation channel. Each of the first triangular sections are rigid and adapted to, in use, be pivotally mounted to opposite side walls of the trapezoidal irrigation channel. Each of the second triangular sections including the pivotal mounting on opposite sides of the rigid rectangular section are formed of a flexible material. Also disclosed is a pipe flow meter and a duckbill valve.

17 Claims, 11 Drawing Sheets

(51) Int. Cl.
  *G01F 1/66*   (2006.01)
  *G01F 15/00*  (2006.01)
  *E02B 13/02*  (2006.01)
  *E02B 8/04*   (2006.01)
  *F16K 7/04*   (2006.01)
  *F16K 15/14*  (2006.01)
  *F16L 11/00*  (2006.01)

(52) U.S. Cl.
  CPC ............... *F16K 7/04* (2013.01); *F16K 15/147* (2013.01); *F16L 11/00* (2013.01); *G01F 1/662* (2013.01); *G01F 1/667* (2013.01); *G01F 15/005* (2013.01); *Y10T 137/7882* (2015.04)

(56) References Cited

U.S. PATENT DOCUMENTS

| | | | |
|---|---|---|---|
| 3,693,357 A | 9/1972 | Shettel | |
| 3,874,176 A | 4/1975 | Shettel | |
| 4,229,119 A * | 10/1980 | Borca et al. | 405/96 |
| 4,549,837 A | 10/1985 | Hebert | |
| 5,158,396 A * | 10/1992 | Menard | 405/91 |
| 5,984,575 A * | 11/1999 | Knott, Sr. | 405/92 |
| 6,585,005 B1 | 7/2003 | Raftis et al. | |
| 2004/0069360 A1 | 4/2004 | Raftis | |

FOREIGN PATENT DOCUMENTS

| | | |
|---|---|---|
| JP | 2002330647 | 11/2002 |
| WO | 2011020143 | 2/2011 |
| WO | 2012129609 | 10/2012 |

OTHER PUBLICATIONS

International Application No. PCT/AU2013/000777, International Search Report and Written Opinion mailed Oct. 24, 2013.

* cited by examiner

CONTROL GATES AND VALVES

CROSS-REFERENCE TO RELATED APPLICATIONS

This application is a national stage application pursuant to 35 U.S.C. §371 of International Application No. PCT/AU2013/000777, filed Jul. 12, 2013, which claims priority to Australian Patent Application No. 2012-903003, filed Jul. 13, 2012, the disclosures of which are hereby incorporated by reference herein.

BACKGROUND OF THE INVENTION

The present invention relates to control gates, duckbill valves and flow meter for irrigation.

SUMMARY OF THE INVENTION

The present invention in one aspect provides an overshot control gate for use with trapezoidal irrigation channels, said gate having a rigid rectangular section adapted to, in use, be pivotally mounted to the base of said trapezoidal irrigation channel, a pair of triangular sections pivotally mounted on opposite sides of said rigid rectangular section, each of said triangular sections being divided into first and second triangular sections with a common apex at said base of said trapezoidal irrigation channel, each of said first triangular sections being rigid and adapted to, in use, be pivotally mounted to opposite side walls of said trapezoidal irrigation channel, and each of said second triangular sections including said pivotal mounting on said opposite sides of said rectangular section and being formed of a flexible material.

Preferably the surface area of said second triangular sections is substantially smaller than the surface area of said first triangular sections. In a further preferment in the fully open position of said overshot control gate, said rigid rectangular section lies flat on said base of said trapezoidal irrigation channel and said triangular sections lie flat on respective side walls of said trapezoidal irrigation channel. In a practical embodiment said rigid rectangular section is raised and lowered by an actuation means attached to the side opposite to its pivotally mounting to said base of said trapezoidal irrigation channel.

In another aspect there is provided a pipe flow meter including a pipe section through which liquid flows, said pipe section at one end adapted to be connected to a pipe containing said liquid, said pipe section having at least one pair of flow sensors for detecting flow rate of said liquid through said pipe section, said at least one pair of flow sensors being located on at least one substantially horizontal plane and a duckbill valve at the other end of said pipe section adjacent said flow sensors, said duckbill valve having its opening oriented on a substantially vertical plane.

In a practical embodiment said at least one pair of flow sensors contains a pair of flow sensors on said at least one substantially horizontal plane with the sensors being on opposing sides of said pipe section in a diagonal configuration. Preferably said at least one pair of flow sensors contains two pairs of flow sensors on at least one substantially horizontal plane with each pair of sensors being on opposing sides of said pipe section in a diagonal configuration. In a further preferment said at least one pair of flow sensors contains two pairs of flow sensors on a pair of substantially horizontal planes with each pair of sensors being on opposing sides of said pipe section in a diagonal configuration.

The invention also provides a duckbill valve including a sleeve of flexible material having at one end a wide opening adapted to, in use, to be coupled to a source of liquid to be controlled and said sleeve tapering to a narrow linear mouth forming a normally closed opening at the other end through which liquid can exit from the valve, a first frame adapted to be coupled to said valve, said frame external to said sleeve having a ring adapted to co-operate with said wide opening of said sleeve and a pair of struts pivotally attached to said ring at one end of respective struts, said struts being pivotally attached at the other end of respective struts to respective mounting points located midway and on opposite sides of said narrow linear mouth to prevent collapsing of said sleeve.

Preferably a plurality of pairs of struts are provided pivotally attached to mounting points on said narrow linear mouth and to said ring.

A further aspect of the invention provides a duckbill valve including a sleeve of flexible material having at one end a wide opening adapted to, in use, to be coupled to a source of liquid to be controlled and said sleeve tapering to a narrow linear mouth forming a normally closed opening at the other end through which liquid can exit from the valve, a first frame adapted to be coupled to said valve, said frame external to said sleeve having a ring adapted to co-operate with said wide opening of said sleeve and a set of four struts equispaced around and pivotally attached to said ring at one end of respective struts, said struts being pivotally attached at the other end of respective struts to respective mounting points located midway and at opposing ends of said narrow linear mouth to prevent collapsing of said sleeve.

Preferably the duckbill valve further includes a further frame having four further struts in a scissor jack arrangement pivotally attached to further mounting points on said frame. An actuator may be coupled to one of said four struts, whereby movement of said actuator allows opening and closing of said duckbill valve.

In a further example of the invention there is provided a flexible pipe valve for controlling low pressure hydraulic networks, said valve including a flexible pipe member adapted, in use, to be connected to an entry or exit end of a pipe through which liquid is to flow, said valve having a lifting ring at its end opposite the connection to the entry or exit end of said pipe, said lifting ring being coupled to an actuator for raising and lowering said flexible pipe member above the surface level or static head of said liquid.

The flexible pipe valve may further include a coupling ring adapted to be coupled to said entry or exit end of said pipe and a plurality of struts pivotally attached between said lifting ring and said coupling ring to provide support for said flexible pipe member whilst being raised and lowered. The flexible pipe member may include a plurality of annular rings along its length to provide support for said flexible pipe member whilst being raised and lowered.

In a practical embodiment said lifting ring has a U- or C-shaped member pivotally attached to said lifting ring and said actuator is pivotally attached to said U- or C-shaped member. The lifting ring may also be cylindrically shaped. A coupling ring may be adapted to be coupled to said entry or exit end of said pipe and a plurality of struts pivotally attached between said lifting ring and members on said coupling ring providing a vertical offset for the pivot connection to provide support for said flexible pipe member whilst being raised and lowered.

BRIEF DESCRIPTION OF THE DRAWINGS

The structure and functional features of preferred embodiments of the present invention will become more apparent from the following detailed description when taken in conjunction with the accompanying drawings, in which:—

DESCRIPTION OF THE PREFERRED EMBODIMENTS

Figure 1:
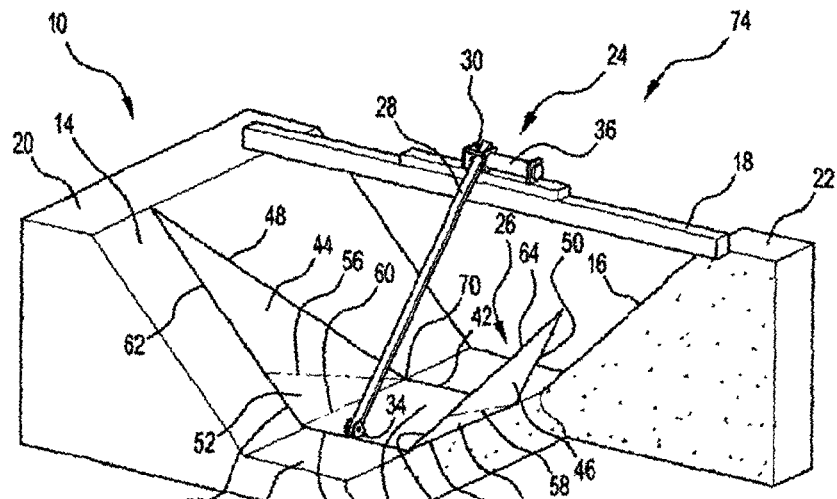
FIG. 1 is a perspective view with a partial cutaway of a first embodiment of a overshot flow control gate shown in the fully open position.

In order to avoid duplication of description, identical reference numerals will be shown, where applicable, throughout the illustrated embodiments to indicate similar integers.

It is known that a common overshot barrier gate mechanism used in irrigation industry is known as a Padman Stop. This gate was designed for use in trapezoidal channels with a 1:1 bank slope. It comprises a rigid rectangular panel hinged across the bed of a channel so that when the barrier gate is fully open the panel lays flat in the bed of the trapezoidal channel. Two side members of the barrier gate comprise triangular sections of a flexible material attached to either side of the rectangular panel. The triangular sections are attached to the channel bank at 45° to the horizontal. When the barrier gate is full open and fully closed the flexible material is taut. Between the open and closed positions the flexible material sections are relaxed which can be unstable during the gate operation.

Figure 2:
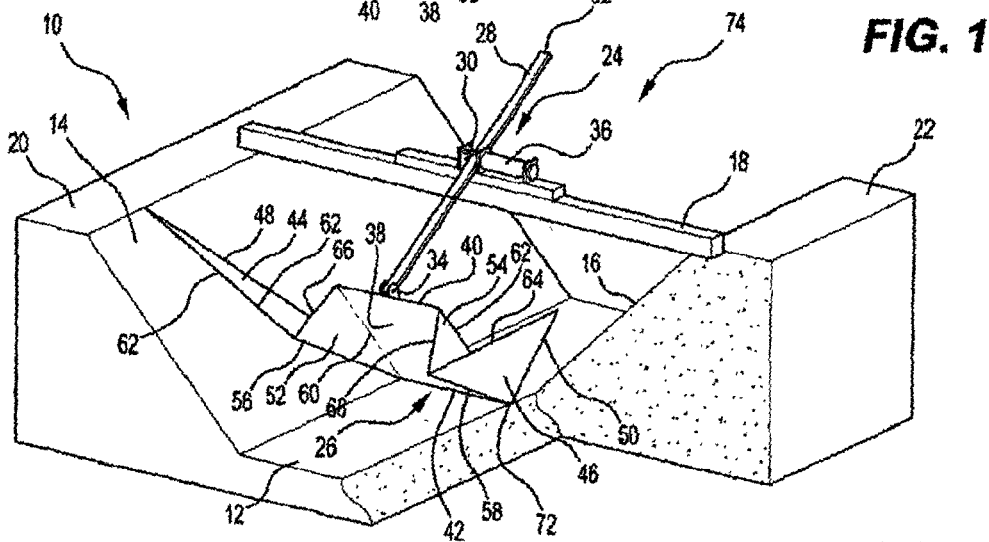
FIG. 2 is a similar view to that of FIG. 1 with the flow control gate being raised from the open position of FIG. 1.
Figure 3:
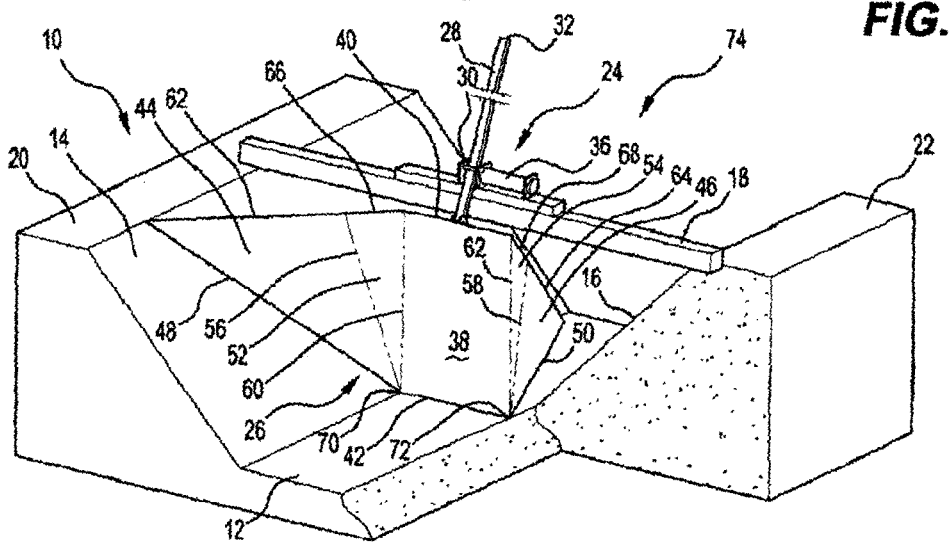
FIG. 3 is a similar view to that of FIG. 1 with the flow control gate shown in the closed position.
Figure 4:
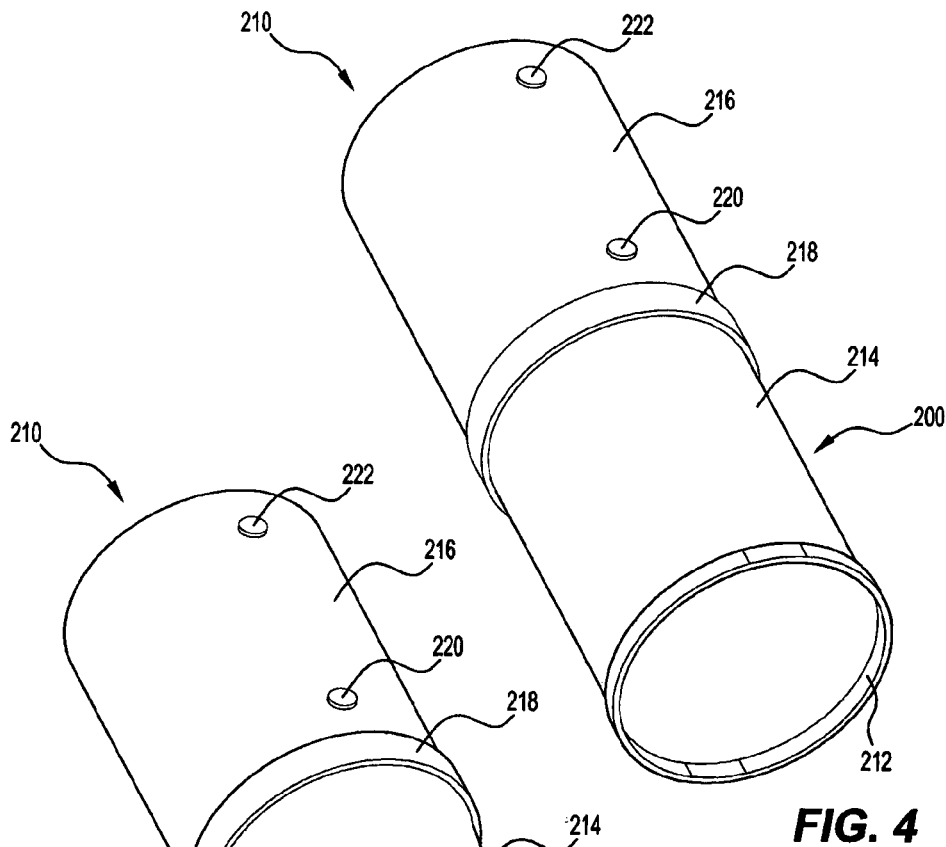
FIG. 4 is a perspective view of an embodiment of a duckbill valve attached to a flow meter in accordance a further aspect of the invention with the valve in the fully open position.
Figure 5:
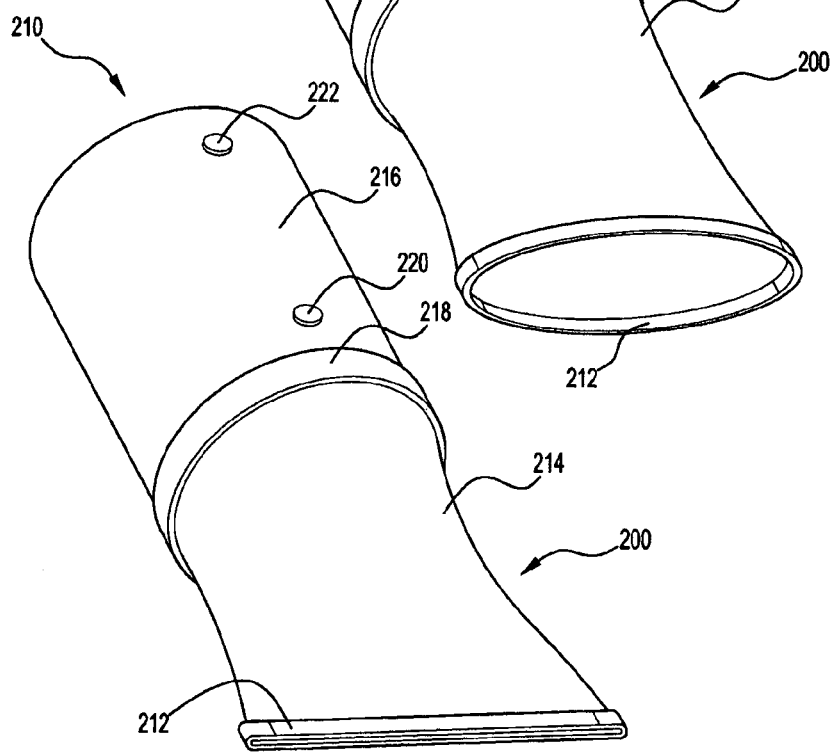
FIG. 5 is a similar view to that of FIG. 4 showing the valve closing.

The embodiment shown in FIGS. 1 to 3 allows stability during gate operation. FIGS. 1 to 3 show a trapezoidal irrigation channel 10 having a horizontal base 12 and angled side walls 14, 16. The side walls 14, 16 are angled at 45°. The angle is not restricted to 45° as the angle can vary. A beam 18 traverses the channel 10 and is attached to the top surfaces 20, 22 of channel 10. Beam 18 provides support for an actuator 24 which, in use, will raise and lower a flow control gate 26 located across channel 10. The actuator 24 can be of any suitable type, for example, hydraulic, solenoid, cable, etc. which is adapted to the environment in which it operates. In this embodiment, actuator 24 is of the type shown in International Patent Application No. PCT/AU2012/000328, the contents of which are herein incorporated. FIGS. 1 to 5 of International Patent Application No. PCT/AU2012/000328 provides a detailed description of the construction and operation of actuator 24. Actuator 24 is a cable drive device with a linear drive member 28 which moves through a support member 30 attached to beam 18. A cable drum (not visible) is rotatable within support member 30 and controls a cable (not visible) which is tightly connected at pivots 32, 34 at either end of linear drive member 28. An electric motor 36 is coupled to the cable drum to control the winding in and out of the cable to allow movement of linear drive member 28.

Flow control gate 26 is made of various rigid and flexible sections which are joined together to form a barrier. A central section 38 is rigid and has a width equal to the horizontal base 12 of irrigation channel 10. The top 40 of central section 38 is pivotally attached to linear drive member 28 and the bottom 42 is pivotally attached the horizontal base 12 of irrigation channel 10. The depth of the central section 38 i.e. distance between the top 40 and bottom 42 will be selected to be above the depth of water in irrigation channel 10. A pair of rigid sections 44, 46 are pivotally attached to angled side walls 14, 16 respectively at corresponding hinge lines 48, 50. A pair of flexible sections 52, 54 are attached to respective sides 56, 58 of rigid sections 44, 46. Flexible sections 52, 54 are also attached to respective sides 60, 62 of central section 38. FIG. 1 shows the fully open position of the flow control gate 26 with central section 38 lying flat against the horizontal base 12 and sections 44, 52 lying flat against angled side wall 14 and sections 46, 54 lying flat against angled side wall 16. Hinge lines 48, 50 will be at 45° across angled side walls 14, 16. The sides 62, 64 of sections 44, 46 and sides 66, 68 of flexible sections 52, 54 will form with the top 40 of central section 38 a continuous horizontal top wall of flow control gate 26 as seen in FIGS. 1 and 3. The sections 44, 46, 52 and 54 are triangular in shape. Sections 44, 52 and 38 have a common apex 70 and sections 46, 54 and 38 have a common apex 72. It is preferred that the length of sides 62, 64 of sections 44, 46 be about 0.7 to 0.8 of the total length of sides 62, 64 of sections 44, 46 and sides 66, 68 of flexible sections 52, 54.

This embodiment reduces the size of the flexible material used in the Padman Stop gate to retain stability of operation during all movements of flow control gate 26. The operation of flow control gate 26 will now be described. FIG. 1 shows gate 26 in the fully open position where section 38 lies flat against base 12 with sections 44, 52 lying flat against angled side wall 14 and sections 46, 54 lying flat against angled side wall 16. Linear drive member 28 will be fully extended and water can then flow in the direction of arrow 74 over all rigid and flexible sections. FIG. 2 shows flow control gate 26 being closed. Electric motor 36 can be controlled by a computer control system (not shown) to cause actuator 24 to operate and pull rigid central section 38 off the base 12 to raise gate 26. As sections 44, 46, 52 and 54 are directly or indirectly connected to central section 38 they will also be raised and will sections 44, 46 will pivot along hinge lines 48, 50. Flexible sections 52, 54 will bend in response to the raising of control gate 26. Water can then flow over the top wall formed by the sides 62, 64 of sections 44, 46, the sides 66, 68 of flexible sections 52, 54 and top 40 of central section 38. FIG. 3 shows the fully closed position of gate 26 with linear drive member 28 fully retracted.

Typical flow meter installations require a continuous and undisturbed length of pipe both upstream and downstream of the meter to ensure the necessary symmetrical velocity profile for flow measurement reading. The standard length required upstream is typically ten diameters and downstream is typically four diameters. Another requirement with most pipe flow meters is that the pipe needs to be full of water in order for the meter to operate correctly. The water level cannot drop below the overt of the pipe.

Figure 6:
FIG. 6 is a similar view to that of FIG. 4 showing the valve in the fully closed position.
Figure 7:
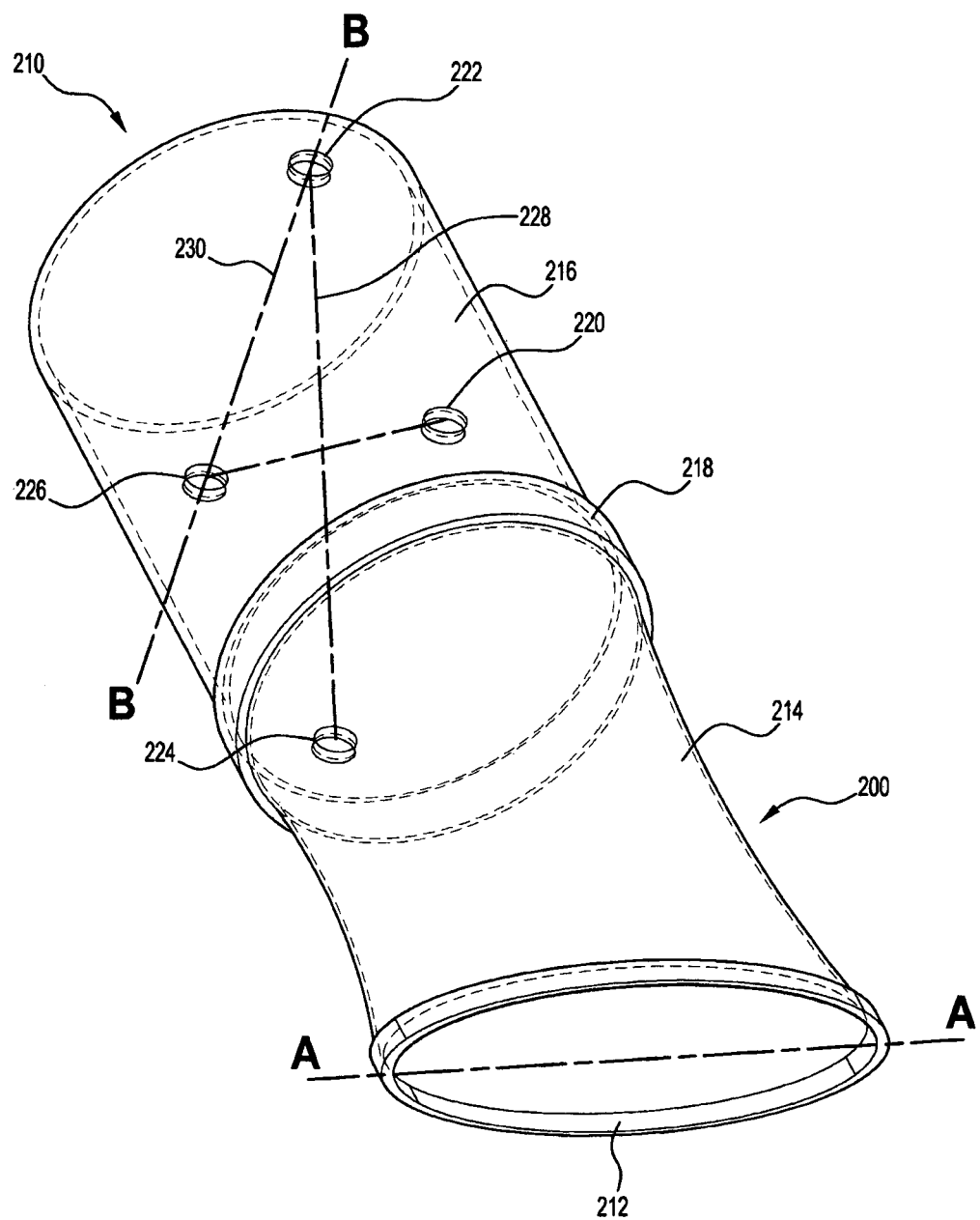
FIG. 7 is a similar view to that of FIG. 5 but shows the hidden details in dotted lines.

The embodiment shown in FIGS. 4 to 7 provides the combination of a flow meter 210, of which only a partial section is shown, and a duckbill valve 200. The flow meter 200 can be of any type but a preferred flow meter is disclosed and its operation detailed in Australian Patent Application No. 2010283959 or International Patent Application No. PCT/AU2010/001052, the contents of which are herein incorporated into this specification. The flow meter is commercially available under the trade mark SONARAY from Rubicon Research Pty Ltd. Duckbill valves are also commercially available and a typical valve is known as a Tideflex check valve. Valve 200 has a sleeve 214 of rubber or other suitable material attached to pipe 216 by clamping ring 218. The duckbill valve 200 has a resilient ring 212 or two straight stiffener frames embedded in the valve at its opening edge to cause closing of the valve when required. The resilient ring 212 or two straight stiffener frames collapse to a linear shape when the external pressure is greater than or equal to the internal pressure within the valve as shown in FIG. 6. Pipe 216 is part of the flow meter 210 and has a plurality of acoustic transducers 220, 222, 226 and 228 on a common horizontal plane B-B in FIG. 7. The acoustic transducers 220, 222, 226 and 228 will be integrated into a flow measurement system (not shown, but described in Australian Patent Application No. 2010283959 or International Patent Application No. PCT/AU2010/001052. It is not necessary to have four (4) acoustic transducers as a single pair of acoustic transducers would be sufficient. Additional acoustic transducers (not shown) can be arranged on further horizontal planes, if required. The acoustic transducers will operate in pairs in a diagonal arrangement as indicated by arrows 228, 230. The horizontal plane B-B contrasts with the perpendicular orientation A-A of the mouth of duckbill valve 200 in its closed position as seen in FIG. 7.

The combination of the flow meter 210 with the duckbill valve 200 allows connection of the downstream end of pipe 216 of flow meter 210 and does not require the normal upstream and downstream pipe lengths for the meter to operate as the duckbill valve is adjacent the transducers. The use of duckbill valve 200 ensures a symmetrical hydraulic profile will develop through the valve and therefore through the meter. The valve also ensures the pipe remains full for all flows. Traditionally there would be a requirement to place a permanent obstruction, such as an overflow weir, downstream of the pipe and meter to ensure the pipe always remained full for the flow meter. This type of obstruction is a permanent feature that will induce energy loss for all flows, whether necessary or not. This embodiment provides a graduated level of back pressure to ensure the pipe is full at low flows (when necessary) and with minimal back pressure at high flows when the feature is not required. The combination allows the meter to be located at the end of a pipe, which was previously not possible, because the duckbill valve 200 will force the symmetrical velocity profile (perpendicular to 'flat' of the duckbill valve when closed) which is necessary for Transit Time (Time of Flight) flow meters such as described in Australian Patent Application No. 2010283959 or International Patent Application No. PCT/AU2010/001052. The duckbill valve 200 also provides an additional necessary function for the flow meter—it provides necessary back pressure in order to keep the pipe full for all flows. The pipe will need to be kept full in order for the flow meter to operate correctly. The ability for the duckbill valve 200 to provide this function on a gradual basis depending on the flow and pressure in the pipe is a feature of this embodiment. The hydraulic head loss is therefore kept to a minimum and only that which is necessary for the flow. Typically, a permanent weir or equivalent is used to for this purpose as previously discussed. A permanent weir will add to the hydraulic head loss and will be higher than that which is required, especially at higher flows. At high flows the duckbill valve 200 has minimal hydraulic loss. The prevention of back flow offered by the duckbill valve is not an essential feature of this embodiment, although it is the primary feature of the valve as it is currently sold.

Duckbill valves are a one-piece rubber matrix of numerous natural and synthetic elastomers and ply reinforcement, similar in construction to a truck tire. They do not need periodic maintenance or repair to keep them operational and they have a long operational life span. Duckbill valves operate using line pressure and back-pressure to open and close so no outside energy source is required. Typical of these valves is a valve called a Tideflex check valve. Duckbill valves maintain their shape during their various modes of operation. As a non-return valve they prevent a body of water external to the valve and pipe and at a higher pressure than within the pipe, entering the pipe. The flexible membrane naturally collapses with the opening of the valve going from a circular shape when open to a vertical linear shape. Two straight stiffener frames are embedded in the valve at its opening edge to cause closing of the valve when required. In its opposite mode of operation where the pressure in the pipe is greater than that external to the pipe the valve will open.

In the embodiment shown in FIGS. 8 to 11 there is shown a duckbill valve 100 fitted to a pipe 102. Valve 100 has a sleeve 101 of rubber or other suitable material attached to pipe 102 by clamping ring 106. The duckbill valve 100 has a resilient ring 104 which collapses to a linear shape when the external pressure is greater than the internal pressure within the valve. Two pairs of opposing struts 108, 110; 112, 114 are pivotally mounted at one end to resilient ring 104 through protuberances 116, 118. At the other end, struts 108, 110; 112, 114 are pivotally mounted to protuberances 120, 122 on a ring 124 secured to pipe 102.

Figures 8, 9, 10:
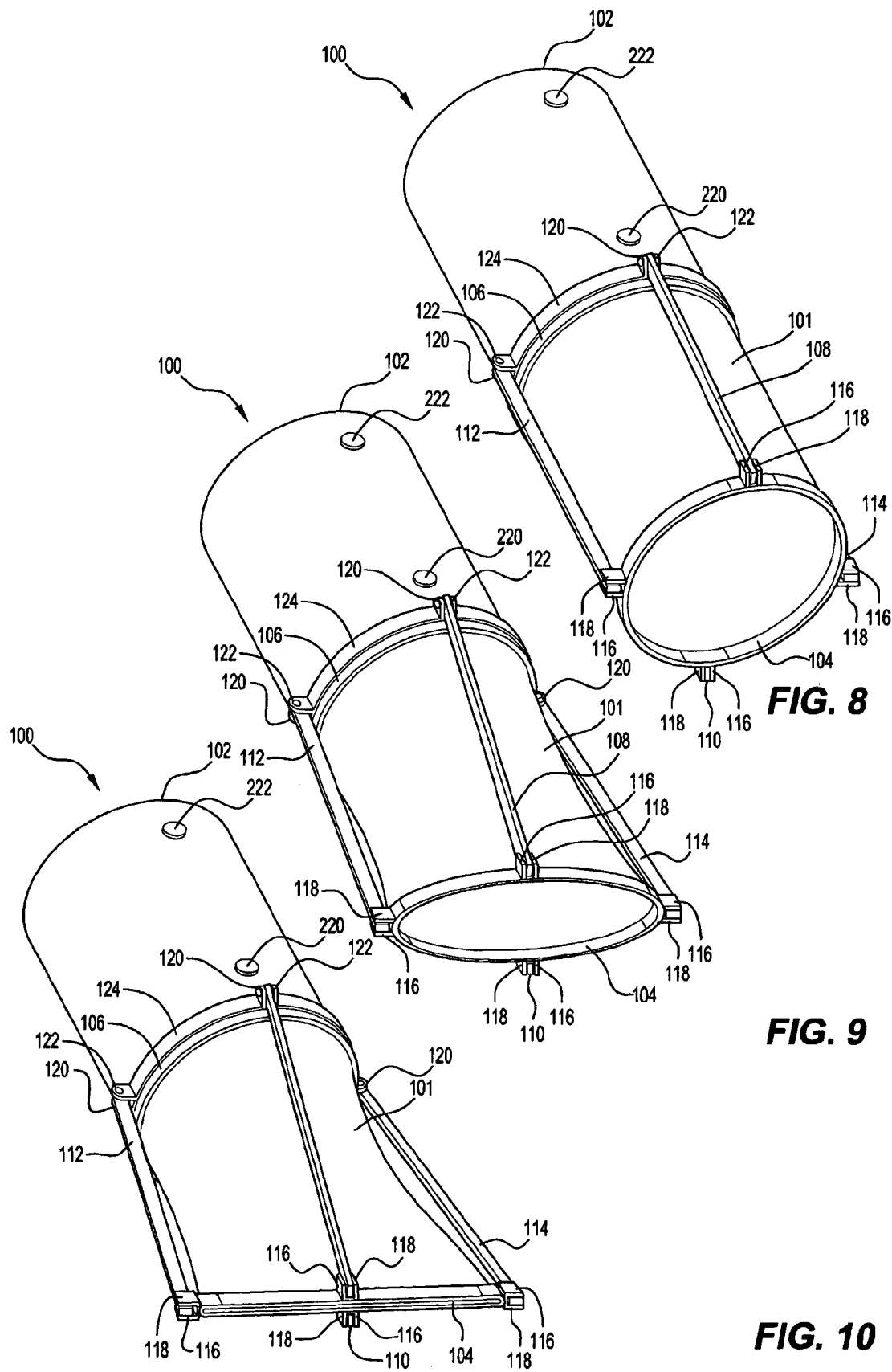
FIG. 8 is a perspective view of an embodiment of a duckbill valve made in accordance with the invention in the fully open position.
FIG. 9 is a similar view to that of FIG. 8 showing the valve closing.
FIG. 10 is a similar view to that of FIG. 8 showing the valve in the fully closed position.
Figure 11:
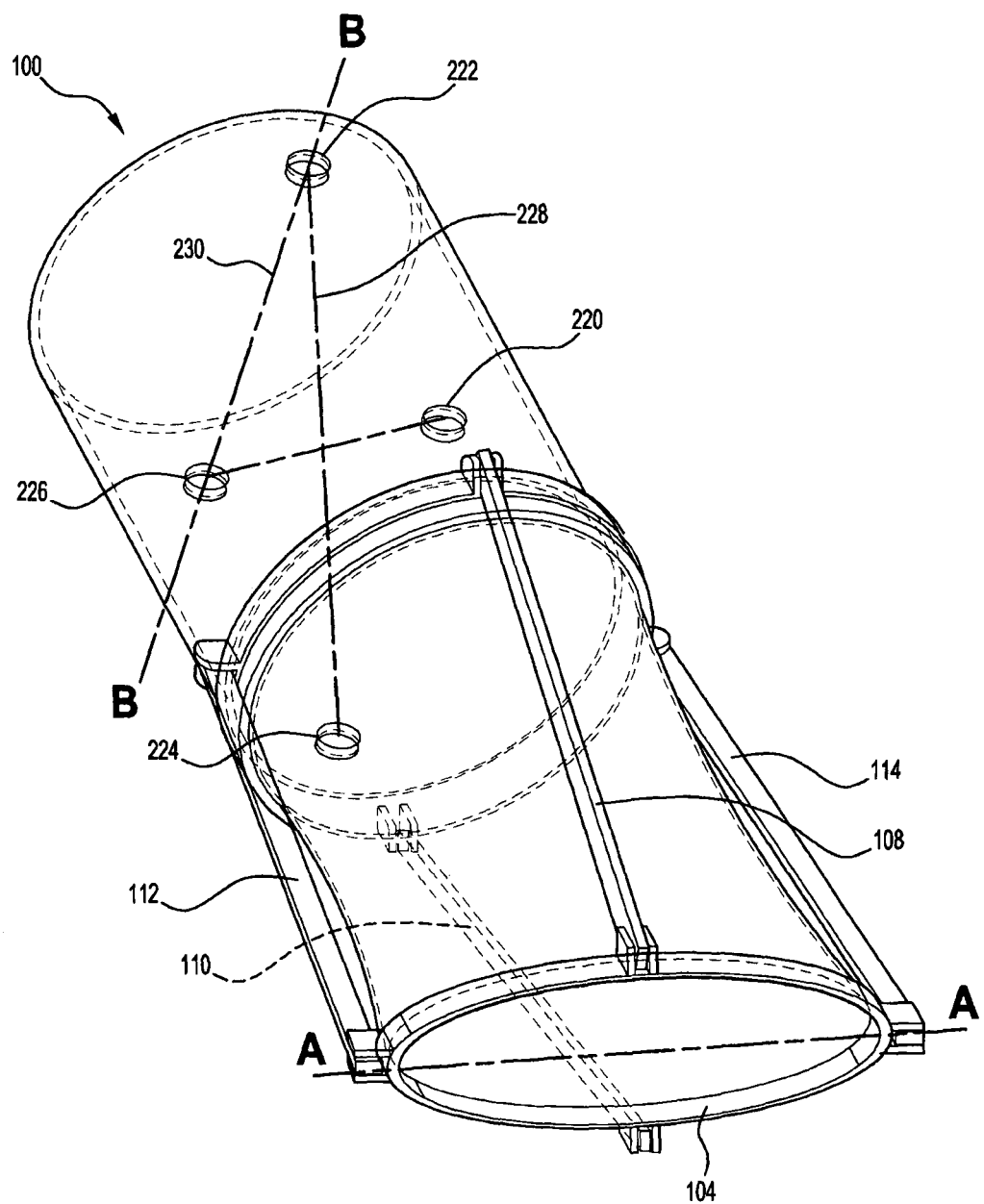
FIG. 11 is a is a similar view to that of FIG. 9 but shows the hidden details in dotted lines.
Figures 12, 13, 14:
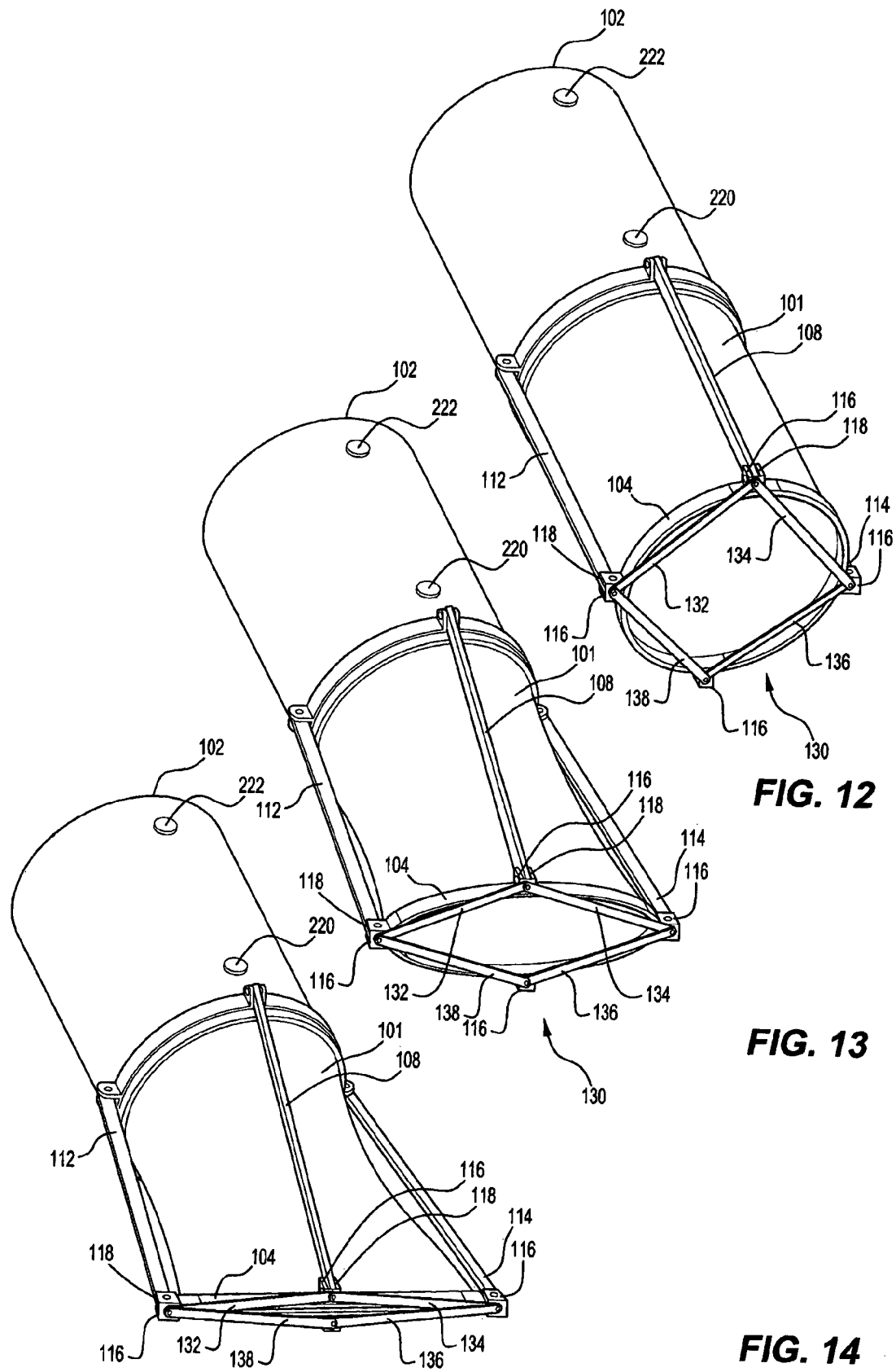
FIG. 12 is a perspective view of a variation of the duckbill valve shown in FIG. 8 in the fully open position.
FIG. 13 is a similar view to that of FIG. 12 showing the valve closing.
FIG. 14 is a similar view to that of FIG. 12 showing the valve in the fully closed position.
Figure 15:
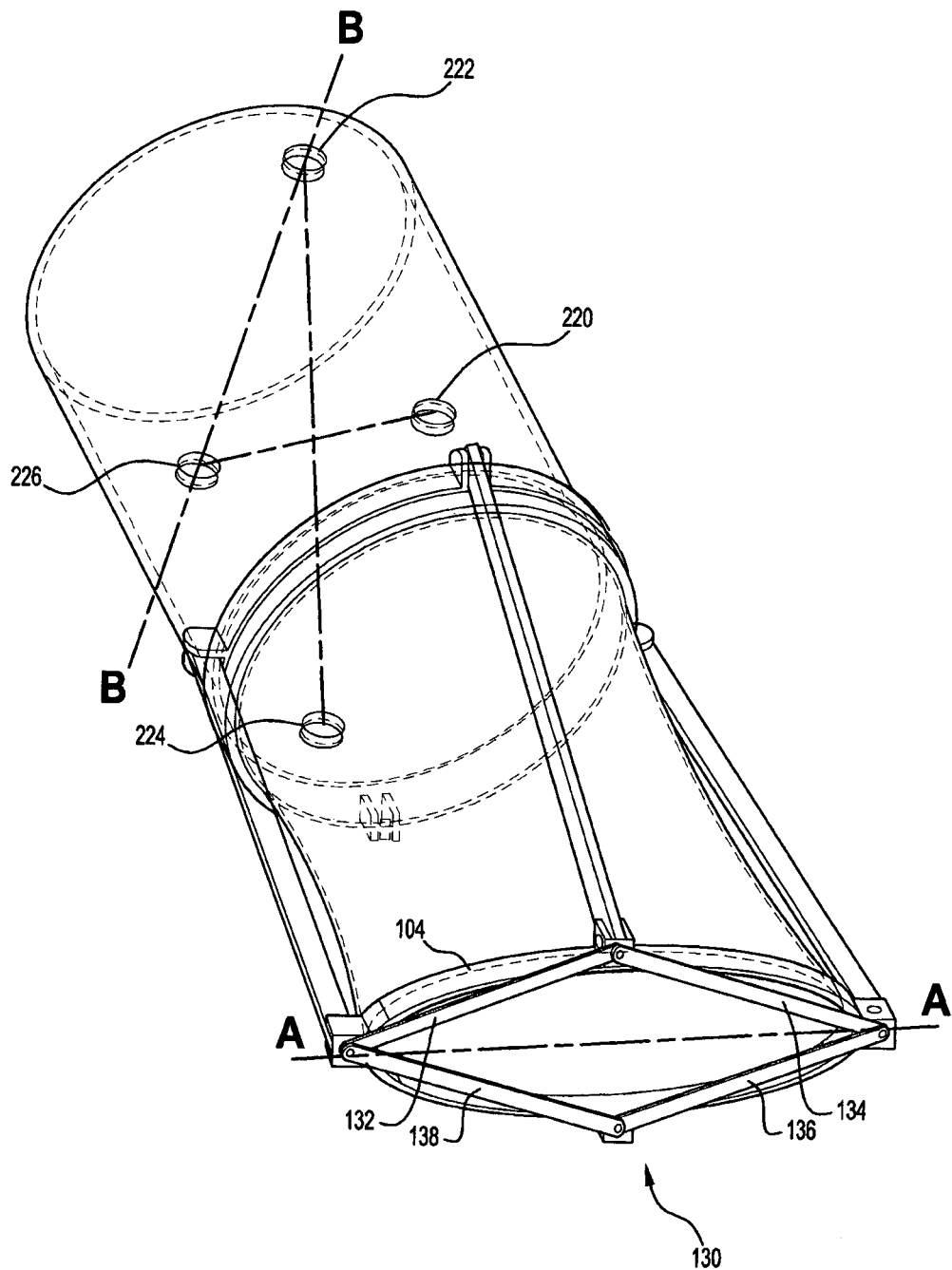
FIG. 15 is a is a similar view to that of FIG. 13 but shows the hidden details in dotted lines.

The embodiment shown in FIGS. 8 to 11 has a frame formed from struts 108, 110; 112, 114 that will maintain the required valve shape without the need for a rigid rubber membrane used in prior art duckbill valves. This allows a lighter and lower cost material to be used. The struts 108, 110; 112, 114 are located near or along the surface of the valve sleeve 101. When the valve 100 is open and in a tubular shape the struts 108, 110; 112, 114 are parallel to the axis of the valve (and pipe), as shown in FIG. 8. As the valve closes the struts will prevent the sleeve 101 from collapsing in view of its lighter and less rigid construction. This will result in a cheaper cost for duckbill valves over the rigid valves of the prior art. The number of struts can be varied to suit requirements. The embodiment has been shown in a similar environment to that of FIGS. 4 to 7 of the previous embodiment.

The embodiment shown in FIGS. 12 to 15 is very similar to the embodiment shown in FIGS. 8 to 11 and only the differences will be discussed. This embodiment uses a scissor jack arrangement 130 attached to protuberances 116, 118. The scissor jack arrangement 130 ensures the valve maintains its required shape. Four struts 132, 134, 136 and 138 are pivotally pinned to protuberances 116, 118 in front of resilient ring 104.

Figure 16:
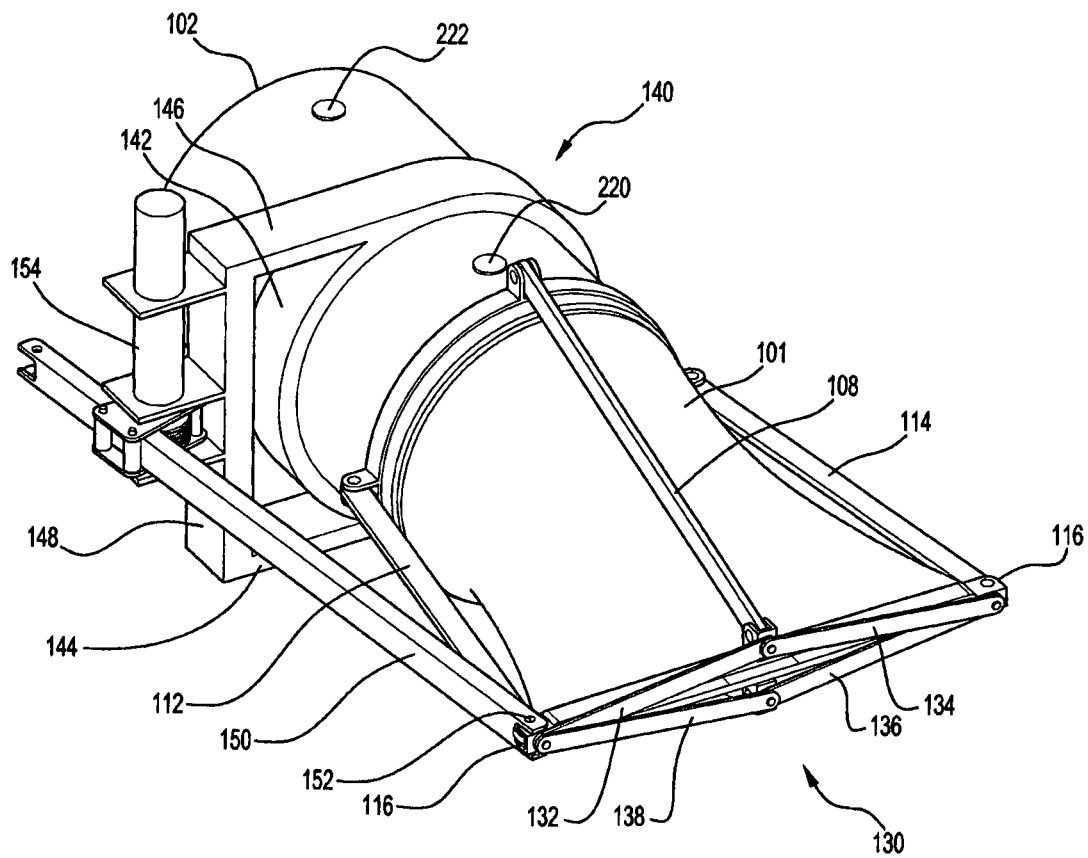
FIG. 16 is a perspective view of a variation of the duckbill valve shown in FIG. 14 shown in the fully closed position.

The embodiment in FIG. 16 is very similar to the embodiment shown in FIGS. 12 to 15 and only the differences will be discussed. A support frame 140 has a ring 142 surrounding pipe 102. A pair of arm members 144, 146 are integrally mounted to ring 142 and a bridge member 148. An actuator 150 is pivotally attached to protuberances 116 at point 152 at one end of actuator 150. Actuator 150 is attached at the other end to bridge member 148. Actuator 150 is raised and lowered under the control of electric motor 154. The actuator 150 can be of any suitable type, for example, hydraulic, solenoid, cable, etc. which is adapted to the environment in which it operates. In this embodiment, actuator 150 is of the type shown in International Patent Application No. PCT/AU2012/000328 the contents of which are herein incorporated. FIGS. 1 to 5 of International Patent Application No. PCT/AU2012/000328 provides a detailed description of the construction and operation of actuator 150. It is preferred that the connection of the actuator 150 is to top strut 112. A force that is applied to strut 112 towards and away from the valve axis will cause the valve to open and close.

The embodiments shown in FIGS. 8 to 16 have four (4) struts 108, 110, 112, and 114, but the number of struts can vary. Struts 112, 114 may be omitted, or additional pairs of oppositely opposed struts may also be used to suit requirements.

Gravity irrigation is typically supplied by 'low pressure'/'low energy' hydraulic networks. Many of these networks require valves that are only required to provide control against small static pressure heads.

The embodiments shown in FIGS. 17 to 22 are designed for such for such low energy valve applications. The embodiment shown in FIG. 17 to 22 show a wall 300 mounted across an irrigation channel (not shown) having a valve 310 attached to either an entry or exit end of a pipe 312 (typically in a horizontal location). If the flow of water is in the direction of arrow 314 (FIG. 22) the valve 310 will be used as a pipe entry valve whereas if the flow of water is in the direction of arrow 316 (FIG. 22) the valve 310 will be used as a pipe exit valve.

Valve 310 has a tubular component 318 made of flexible material attached to the end of pipe 312. A clamping ring 320 maintains a waterproof seal for tubular component 318 on pipe 312. A lifting ring 322 is fitted to the other end of tubular component 318. A U or C shaped member 323 is pivotally attached at points 324, 326 of lifting ring 322. An actuator 328 is pivotally attached to member 323 at point 330 at one end of actuator 328. Actuator 328 is attached at the other end to the top 332 of wall 300. Actuator 328 is raised and lowered under the control of electric motor 334. The actuator 328 can be of any suitable type, for example, hydraulic, solenoid, cable, etc. which is adapted to the environment in which it operates. In this embodiment, actuator 328 is of the type shown in International Patent Application No. PCT/AU2012/000328, the contents of which are herein incorporated. FIGS. 1 to 5 of International Patent Application No. PCT/AU2012/000328 provides a detailed description of the construction and operation of actuator 328.

A pair of struts 336 on opposing sides of tubular component 318 (only one is visible in the Figures) are pivotally attached at one end 338 to clamping ring 320 and at the other end 326 to lifting ring 322. The struts 336 will ensure that the tubular component 318 maintains its shape during lifting and lowering motions and the lifting forces will be taken by the struts 336 rather than the tubular component 318.

Figure 17:
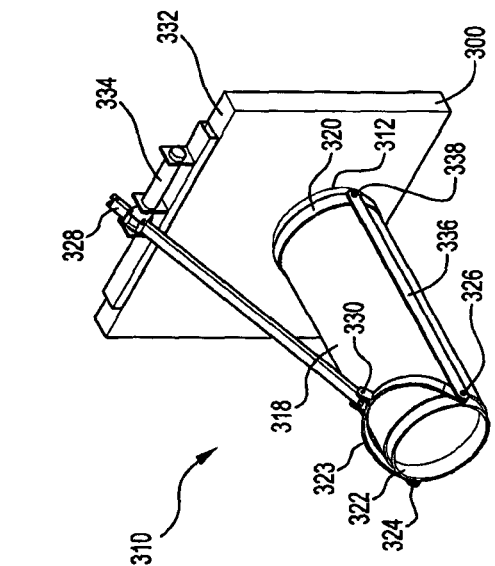
FIG. 17 is a perspective view of an embodiment of a first flexible pipe valve made in accordance with the invention in the fully closed position.
Figure 18:
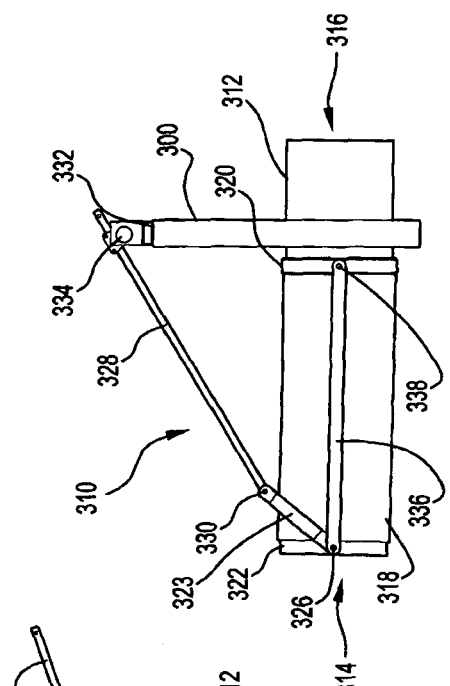
FIG. 18 is a side view of FIG. 17.
Figure 19:
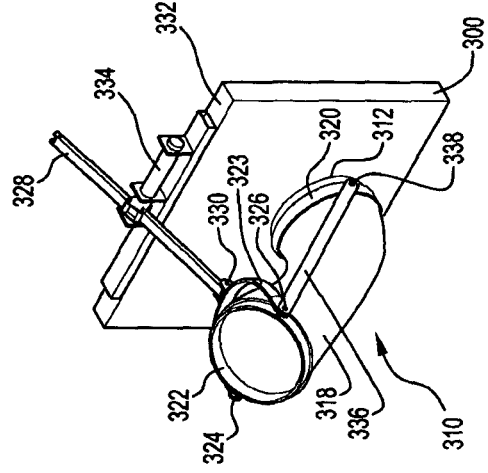
FIG. 19 is a similar view to that of FIG. 17 showing the valve in a partially open position.
Figure 20:
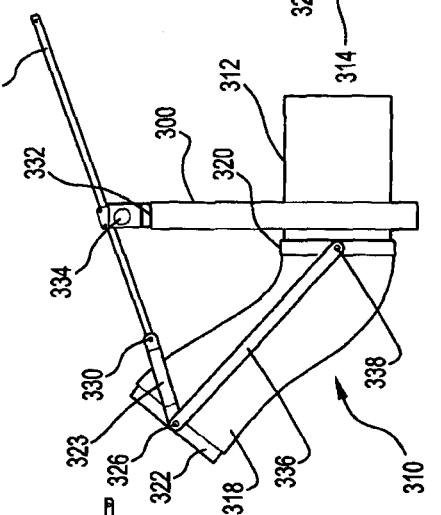
FIG. 20 is a side view of FIG. 19.
Figure 21:
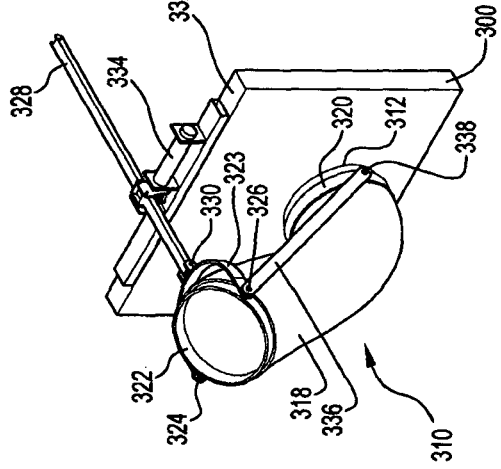
FIG. 21 is a similar view to that of FIG. 17 showing the valve in the fully open position.
Figure 22:
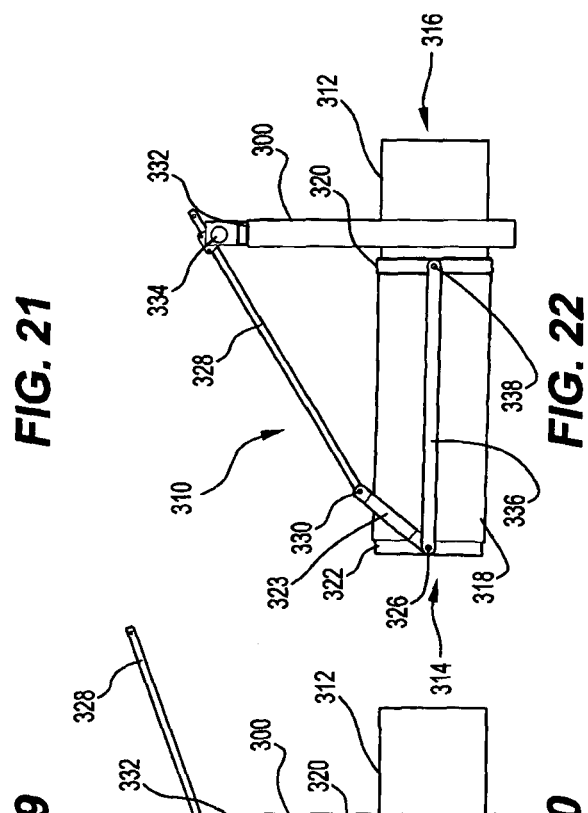
FIG. 22 is a side view of FIG. 21.
Figure 23:
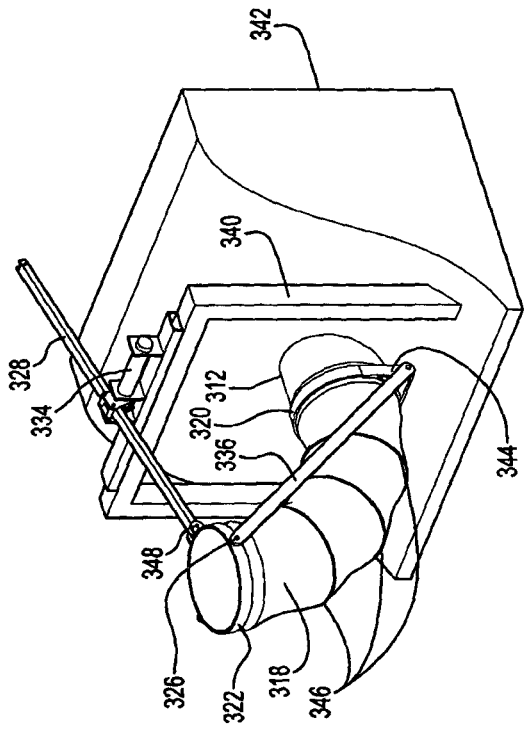
FIG. 23 is a perspective view of an embodiment of a second flexible pipe valve made in accordance with the invention in the fully open position.
Figure 24:
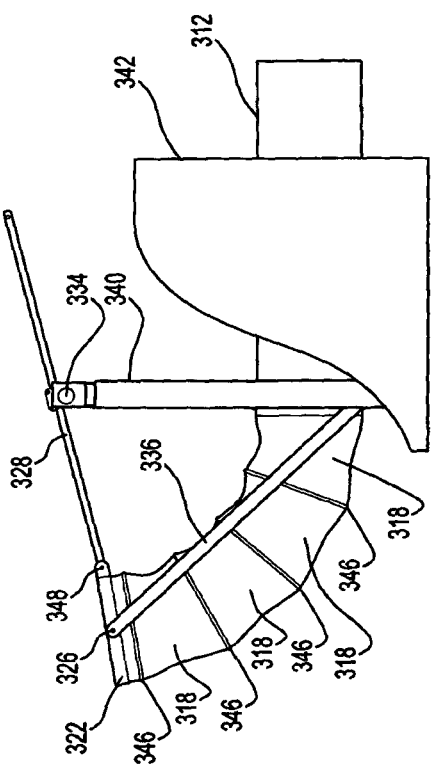
FIG. 24 is a side view of FIG. 23.
Figure 25:
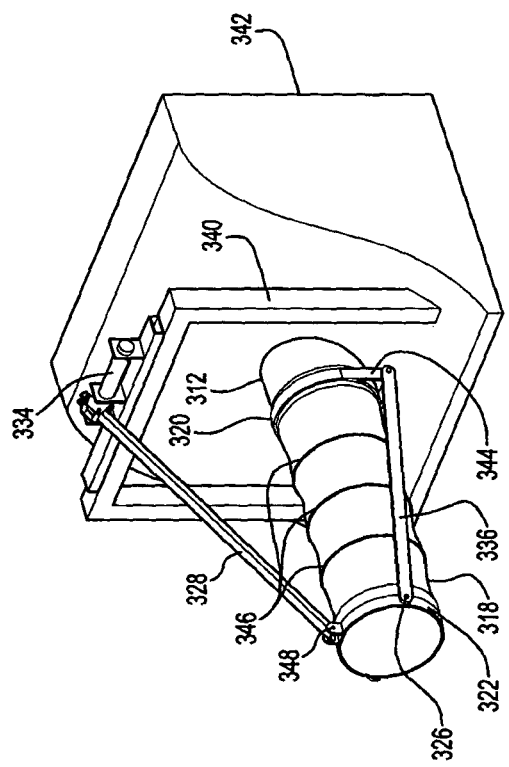
FIG. 25 is a similar view to that of FIG. 23 showing the valve in a fully closed position.
Figure 26:
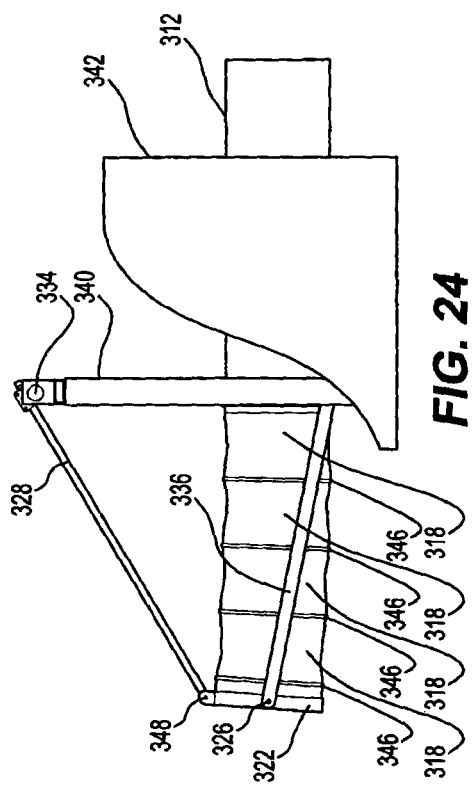
FIG. 26 is a side view of FIG. 25.
Figure 27:
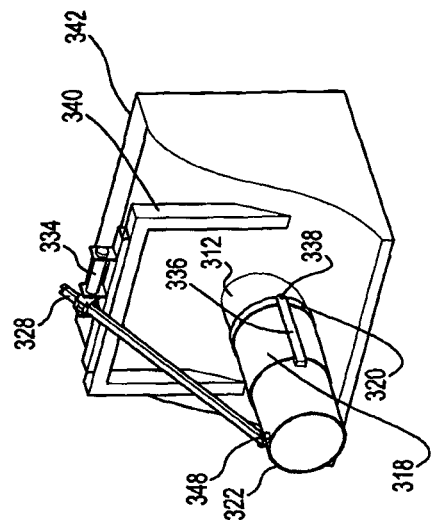
FIG. 27 is a perspective view of an embodiment of a third flexible pipe valve made in accordance with the invention in the fully closed position.
Figure 28:
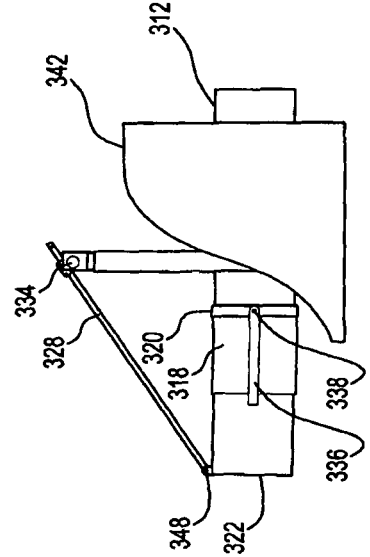
FIG. 28 is a side view of FIG. 27.
Figure 29:
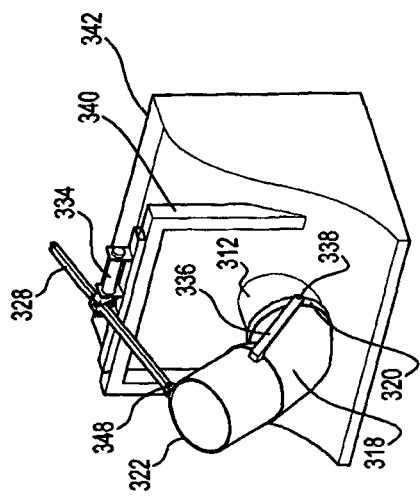
FIG. 29 is a similar view to that of FIG. 27 showing the valve in a partially open position.
Figure 30:
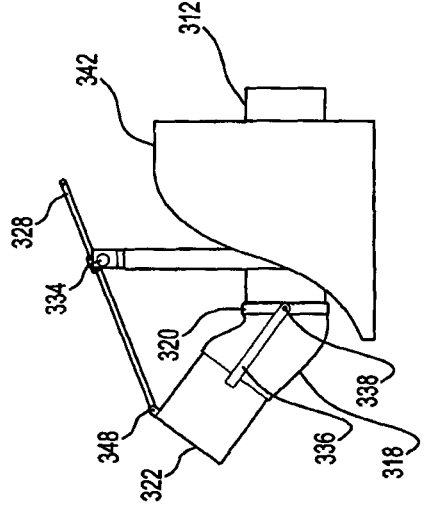
FIG. 30 is a side view of FIG. 29.
Figure 31:
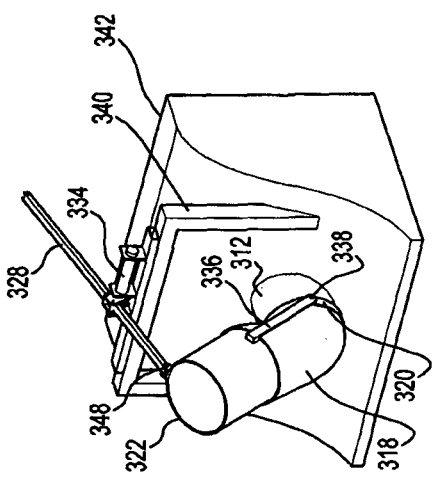
FIG. 31 is a similar view to that of FIG. 27 showing the valve in the fully open position.
Figure 32:
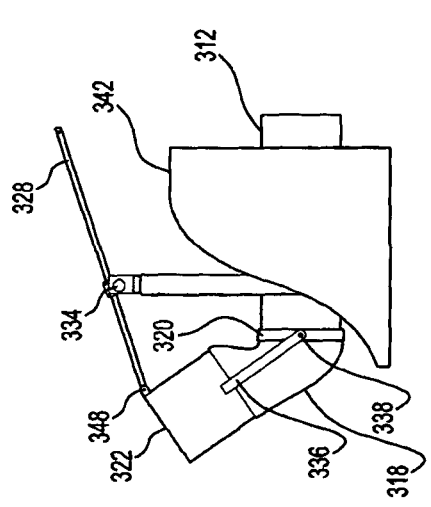
FIG. 32 is a side view of FIG. 31.

Struts 336 on either side of tubular component 318 will prevent impairment of the movement of tubular component 318. Water may enter or exit pipe 312 in the position shown in FIGS. 21 and 22. As actuator 328 pulls up on lifting ring 322 as shown in FIGS. 19, 20, 17, 18 tubular component 318 will be lifted above the surface level or static head of the water. FIGS. 17 and 18 show the valve 310 in the fully closed position.

The embodiment shown in FIGS. 23 to 26 is very similar to the embodiment shown in FIGS. 17 to 22 and only the differences will be discussed. In this embodiment wall 300 has been replaced by a frame 340 which is set into an irrigation wall or weir wall 342. Clamping ring 320 has a pair of depending arms 344 on either side of tubular component 318 which allows the pivot point of struts 336 to be lowered or offset in a vertical direction. Annular rings 346 have been incorporated along tubular component 318 to ensure tubular component 318 maintains a desired shape. U or C shaped member from FIG. 323 has been removed and actuator 328 is pivotally attached at point 348 on lifting ring 322.

The embodiment shown in FIGS. 27 to 32 is very similar to the embodiment shown in FIGS. 17 to 26 and only the differences will be discussed. In this embodiment lifting ring 322 has been lengthened and struts 336 have been shortened. Pivot point 326 has been removed and struts 336 are rigidly fixed to lifting ring 322.

The features described in the embodiments of FIGS. 17 to 32 can be mixed between the embodiments. For example, the U or C shaped member 323, inclusion of annular rings 346, the lengthening of lifting ring 322, shortening of struts 336, removal of pivot point, and offsetting of pivot point of struts 336 can be included in various combinations and are not limited to the features shown in each of these embodiments.

The invention will be understood to embrace many further modifications as will be readily apparent to persons skilled in the art and which will be deemed to reside within the broad scope and ambit of the invention, there having been set forth herein only the broad nature of the invention and certain specific embodiments by way of example.

The invention claimed is:

1. An overshot control gate for use in a trapezoidal irrigation channel, said overshot gate comprising:
   a rigid rectangular section adapted to, be pivotally mounted to a base of said trapezoidal irrigation channel, said trapezoidal irrigation channel having a first side wall and a second side wall, each of said first side wall and said second side wall being on opposite sides of said base;
   a first triangular section, adapted to be pivotally mounted on said first side wall of said trapezoidal irrigation channel, said first triangular section comprising a rigid portion and a flexible portion, said first triangular section having a first apex at said base; and
   a second triangular section pivotally mounted on said second side wall of said trapezoidal irrigation channel, said second triangular section having a second apex at said base, said flexible portion of said first triangular section and said flexible portion of said second triangular section enabling opening and closing said overshot control gate when said rigid rectangular section pivots on said first side wall of said trapezoidal irrigation channel, and when said second triangular section pivots on said second side wall of said trapezoidal irrigation channel;
   wherein said flexible portion of said first triangular section and said flexible portion of said second triangular section are adapted to bend when opening or closing the overshot control gate.

2. The overshot control gate of claim 1, wherein a surface area of said second triangular section is substantially smaller than a surface area of said first triangular section.

3. The overshot control gate of claim 1, wherein, in a fully open position of said overshot control gate, said rigid rectangular section lies flat on said base of said trapezoidal irrigation channel, said first triangular section lies flat on said first side wall, and said second triangular section lies flat on said second side wall of said trapezoidal irrigation channel.

4. The overshot control gate of claim 1, wherein said rigid rectangular section is raised and lowered by an actuation means attached to a side opposite to its pivotally mounting to said base of said trapezoidal irrigation channel.

5. The overshot control gate of claim 1, wherein each of said first triangular section and said second triangular section is adapted to be pivotally mounted to its respective side wall at an angle of approximately 45 degrees to said base of said trapezoidal irrigation channel.

6. The overshot control gate of claim 1, wherein said rigid rectangular section has a width substantially equal to said base of said trapezoidal irrigation channel.

7. The overshot control gate of claim 1, wherein said rigid rectangular section has a height greater than a height of said trapezoidal irrigation channel.

8. The overshot control gate of claim 4, wherein said actuation means is powered by an electric motor.

9. The overshot control gate of claim 8, wherein said electric motor is controlled by a computer system.

10. The overshot control gate of claim 1, wherein:
   said rigid portion of said first triangular section has a first side opposite of said first apex;
   said flexible portion of said first triangular section has a second side opposite of said first apex; and
   said first side has a length of approximately 70%-80% of a combined length of said first side and said second side.

11. The overshot control gate of claim 10, wherein:
   said rigid portion of said second triangular section has a third side opposite of said second apex;
   said flexible portion of said second triangular section has a fourth side opposite of said second apex; and
   said third side has a length of approximately 70%-80% of a combined length of said third side and said fourth side.

12. The overshot control gate of claim 1, wherein said first triangular section and said second triangular section are each coupled to said rigid rectangular section.

13. The overshot control gate of claim 1, wherein said rigid portion of said first triangular section is pivotally mounted on said first side wall of said trapezoidal irrigation channel.

14. The overshot control gate of claim 1, wherein said flexible portion of said first triangular section is positioned between said rigid portion of said first triangular section and said rigid rectangular section.

15. The overshot control gate of claim 1, wherein said rigid portion of said second triangular section is pivotally mounted on said second side wall of said trapezoidal irrigation channel.

16. The overshot control gate of claim 1, wherein said flexible portion of said second triangular section is positioned between said rigid portion of said second triangular section and said rigid rectangular section.

17. A method comprising:
   moving a drive member coupled to an overshot control gate in a trapezoidal irrigation channel to close said overshot control gate in said trapezoidal irrigation channel, said overshot control gate including:
      a rigid rectangular section, adapted to be pivotally mounted to a base of said trapezoidal irrigation channel, said trapezoidal irrigation channel having a first side wall and a second side wall, each of said first side wall and said second side wall being on opposite sides of said base;
      a first triangular section, adapted to be pivotally mounted on said first side wall of said trapezoidal irrigation channel, said first triangular section comprising a rigid portion and a flexible portion, said first triangular section having a first apex at said base; and
      a second triangular section pivotally mounted on said second side wall of said trapezoidal irrigation channel, said second triangular section comprising a rigid triangular portion and a flexible triangular portion, said second triangular section having a second apex at said base, said flexible portion of said first triangular section and said flexible portion of said second triangular section enabling opening and closing said overshot control gate when said rigid rectangular section pivots on said base of said trapezoidal irrigation channel, when said first triangular section pivots on said first side wall of said trapezoidal irrigation channel, and when said second triangular section pivots on said second side wall of said trapezoidal irrigation channel;
   wherein pulling said drive member coupled to said overshot control gate causes said rigid rectangular section to pivot about at least a portion of said base of said trapezoidal irrigation channel, causes said flexible portion of said first triangular section to bend, causes said flexible portion of said second triangular portion to bend, causes said rigid portion of said first triangular section to pivot about at least a portion of said first side wall, and causes said rigid portion of said second triangular section to pivot about at least a portion of said second side wall.

* * * * *